United States Patent
Hiji et al.

(10) Patent No.: US 7,843,530 B2
(45) Date of Patent: Nov. 30, 2010

(54) LIQUID CRYSTAL-CONTAINING COMPOSITION AND LIQUID CRYSTAL DISPLAY DEVICE USING THE SAME

(75) Inventors: Naoki Hiji, Kanagawa (JP); Takeo Kakinuma, Kanagawa (JP); Chikara Manabe, Kanagawa (JP); Tadayoshi Ozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 40 days.

(21) Appl. No.: 12/470,165

(22) Filed: May 21, 2009

(65) Prior Publication Data

US 2010/0165260 A1    Jul. 1, 2010

(30) Foreign Application Priority Data

Dec. 26, 2008    (JP)    ............... 2008-334111

(51) Int. Cl.
  G02F 1/1333    (2006.01)
  G02F 1/1334    (2006.01)
  C09K 19/02     (2006.01)
  C09K 19/42     (2006.01)

(52) U.S. Cl. .................. 349/86; 349/89; 349/90; 349/176; 349/185; 252/299.01

(58) Field of Classification Search ............ 252/299.01; 349/86, 89, 90, 176, 185
See application file for complete search history.

(56) References Cited

U.S. PATENT DOCUMENTS

| 5,410,424 | A | 4/1995 | Konuma et al. |
| 5,858,284 | A | 1/1999 | Konuma et al. |
| 6,392,725 | B1 * | 5/2002 | Harada et al. ............... 349/74 |
| 6,580,482 | B1 * | 6/2003 | Hiji et al. ............... 349/115 |
| 6,750,928 | B2 * | 6/2004 | Hiji et al. ............... 349/74 |
| 2005/0264725 | A1 * | 12/2005 | Chari et al. ............... 349/113 |
| 2006/0115604 | A1 | 6/2006 | Hiji et al. |

FOREIGN PATENT DOCUMENTS

| JP | A-5-80303 | 4/1993 |
| JP | A-2000-98326 | 4/2000 |
| JP | A-2001-154219 | 6/2001 |
| JP | A-2006-183046 | 7/2006 |

* cited by examiner

Primary Examiner—Shean C Wu
(74) Attorney, Agent, or Firm—Oliff & Berridge, PLC

(57) ABSTRACT

A liquid crystal-containing composition includes a first cholesteric liquid crystal having a peak wavelength of selective reflection in the range of from 600 nm to 800 nm and encapsulated in a microcapsule and a second cholesteric liquid crystal having a peak wavelength of selective reflection in the range of from 400 nm to 500 nm as the only liquid crystals, and the content of the second cholesteric liquid crystal with respect to the entire cholesteric liquid crystal content is from about 5 weight % to about 40 weight %.

14 Claims, 4 Drawing Sheets

LIQUID CRYSTAL-CONTAINING COMPOSITION AND LIQUID CRYSTAL DISPLAY DEVICE USING THE SAME

CROSS-REFERENCE TO RELATED APPLICATIONS

This application is based on and claims priority under 35 USC 119 from Japanese Patent Application No. 2008-334111 filed on Dec. 26, 2008.

BACKGROUND

1. Technical Field

This invention relates to a liquid crystal-containing composition, and a liquid crystal display device using the same.

2. Related Art

A cholesteric liquid crystal is composed of rod-like molecules that are aligned helically, and reflects light corresponding to the helical pitch thereof by interference (referred to as selective reflection). Therefore, when the helical pitch of a cholesteric liquid crystal is set to a pitch corresponding to the wavelength of red, green, or blue light, a vivid color display can be obtained without using a color filter.

In a cholesteric liquid crystal encapsulated in a cell provided with a pair of substrates each having an electrode, the cholesteric liquid crystal may be aligned in two states: planar (P) alignment or focal conic (F) alignment. The P alignment is a state in which the helical axis is aligned perpendicular to the substrate surface, and can cause selective reflection. The F alignment is a state in which the helical axis is aligned in parallel with the substrate surface, and can transmit light. The alignment state of the liquid crystal can be switched between these two states when a voltage is applied between the electrodes.

Therefore, when a light absorber, such as a black light absorber, is disposed on a back surface of the cell, a bright display exhibiting a selective reflection color is provided under the P alignment state, and a dark display exhibiting the black color of the light absorber is provided under the F alignment state. The P and F alignment states can be stably maintained without supplying power. A memory display which can maintain a display without supplying power thereto is achieved by utilizing such properties.

SUMMARY

According to an aspect of the invention, there is provided a liquid crystal-containing composition including a first cholesteric liquid crystal having a peak wavelength of selective reflection in the range of from 600 nm to 800 nm and encapsulated in a microcapsule and a second cholesteric liquid crystal having a peak wavelength of selective reflection in the range of from 400 nm to 500 nm as the only liquid crystals, and the content of the second cholesteric liquid crystal with respect to the entire cholesteric liquid crystal content being from about 5 weight % to about 40 weight %.

BRIEF DESCRIPTION OF THE DRAWINGS

Exemplary embodiments of the present invention will be described in detail based on the following figures, wherein.

DETAILED DESCRIPTION

Liquid Crystal-Containing Composition

A liquid crystal-containing composition of an exemplary embodiment of the invention contains a cholesteric liquid crystal.

The cholesteric liquid crystal includes a first cholesteric liquid crystal having a peak wavelength of selective reflection in the range of from 600 nm to 800 nm and a second cholesteric liquid crystal having a peak wavelength of selective reflection in the range of from 400 nm to 500 nm as the only liquid crystals. At least the first cholesteric liquid crystal is encapsulated in a microcapsule. The first cholesteric liquid crystal is encapsulated with a microcapsule wall. The second cholesteric liquid crystal may be microencapsulated or may not be microencapsulated. When both of the first and second cholesteric liquid crystals are microencapsulated, the first and second cholesteric liquid crystals may be encapsulated in separate microcapsules.

Furthermore, in the liquid crystal-containing composition of the exemplary embodiment, the content of the second cholesteric liquid crystal with respect to the entire cholesteric liquid crystal content is from 5 weight % to 40 weight % (or from about 5 weight % to about 40 weight %).

Figure 1:
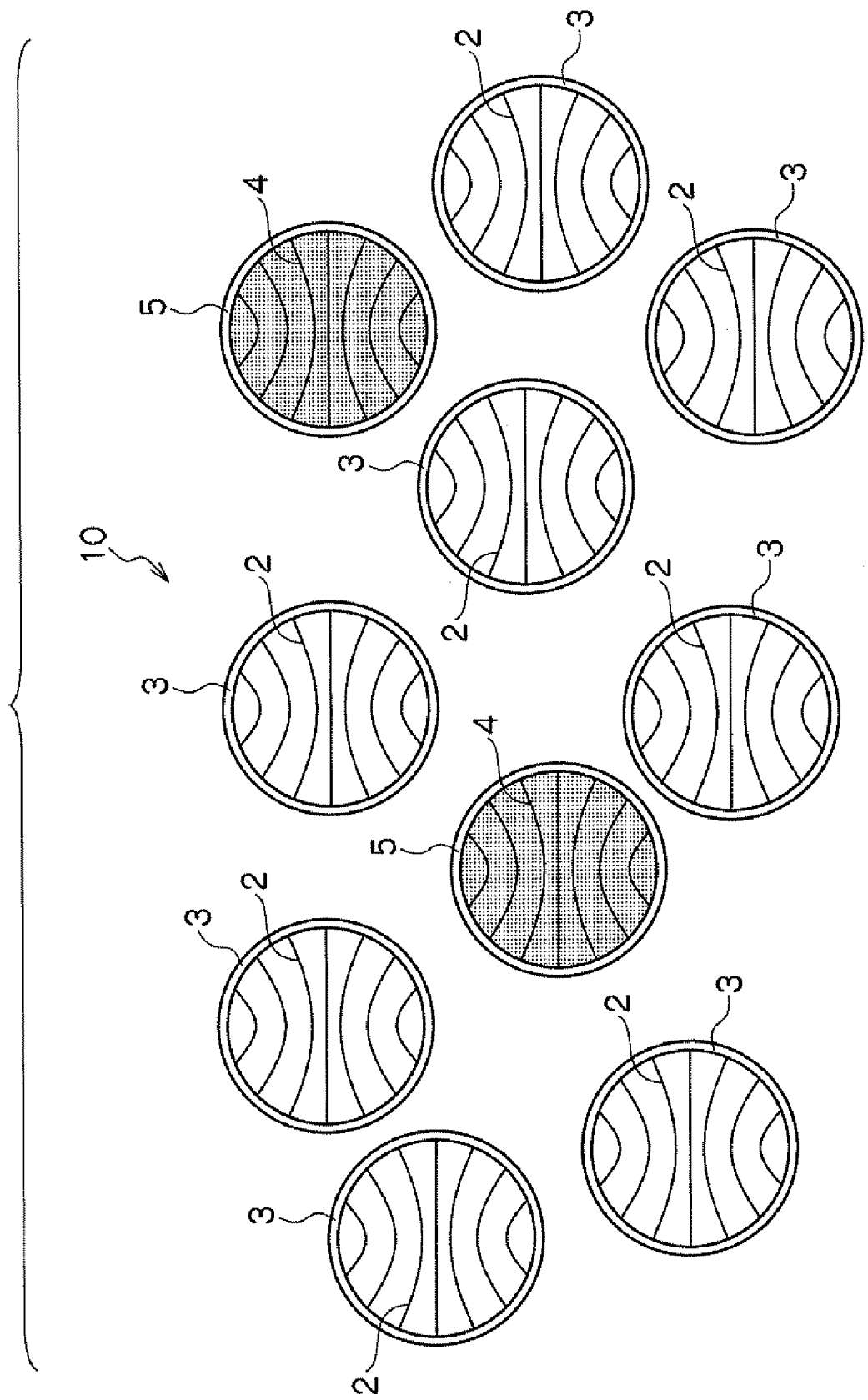
FIG. 1 is a schematic configuration diagram illustrating an example of a liquid crystal-containing composition according to an exemplary embodiment of the invention.
Figure 2:
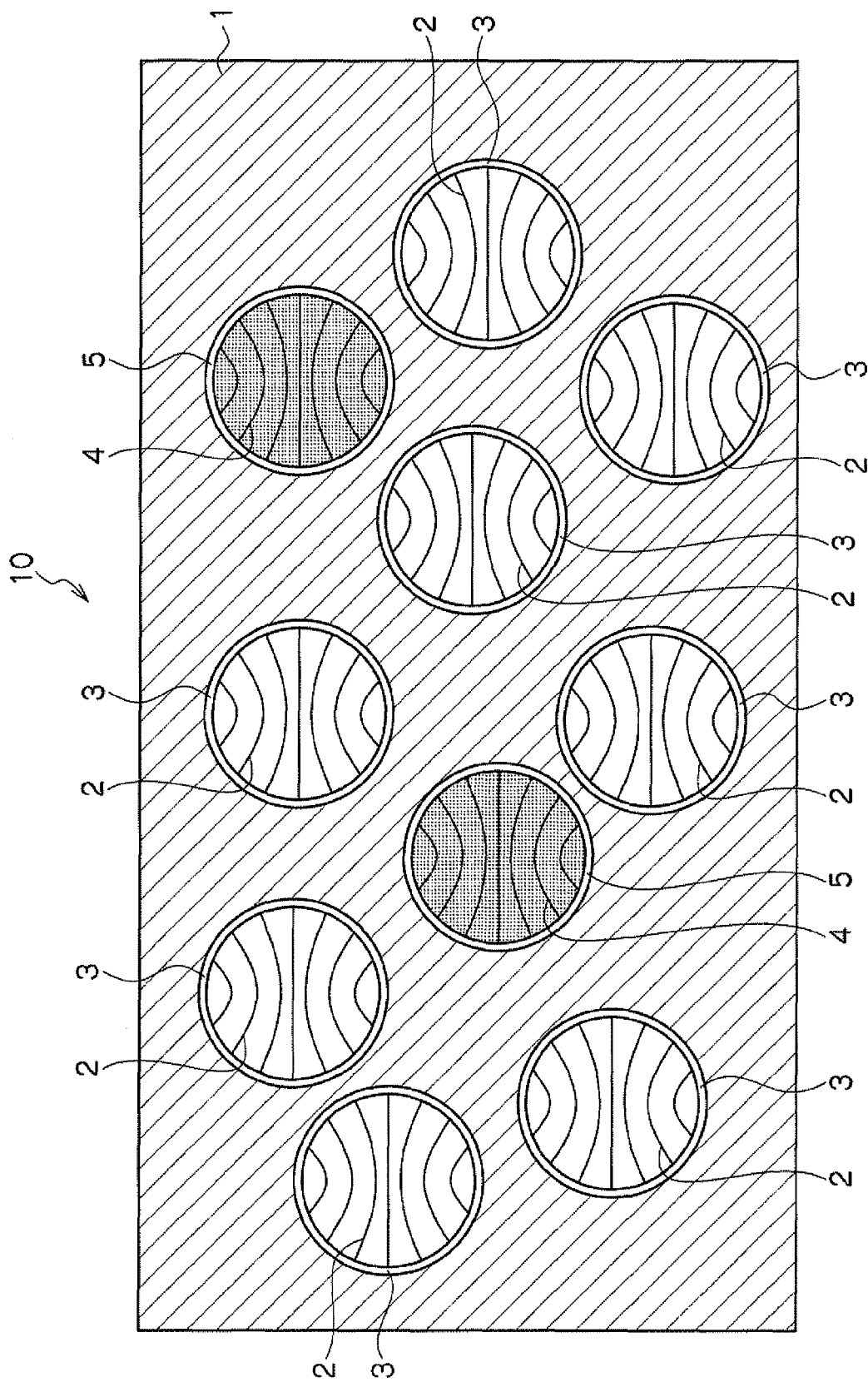
FIG. 2 is a schematic configuration diagram illustrating another example of the liquid crystal-containing composition according to an exemplary embodiment of the invention.

FIG. 1 is a schematic configuration diagram illustrating an example of the liquid crystal-containing composition according to an exemplary embodiment of the invention. FIG. 2 is a schematic configuration diagram illustrating another example of the liquid crystal-containing composition according to an exemplary embodiment of the invention.

As shown in FIG. 1, for example, a liquid crystal-containing composition 10 according to the exemplary embodiment of the invention has a cholesteric liquid crystal 2 (a first cholesteric liquid crystal), a microcapsule wall 3 encapsulating the cholesteric liquid crystal 2, a cholesteric liquid crystal 4 (a second cholesteric liquid crystal), and a microcapsule wall 5 encapsulating the cholesteric liquid crystal 4. Thus, in the liquid crystal-containing composition 10 shown in FIG. 1, the second cholesteric liquid crystal is microencapsulated in a similar manner to the first cholesteric liquid crystal.

As illustrated in FIG. 2, for example, a liquid crystal-containing composition 10 according to an exemplary embodiment of the invention may be a liquid crystal-containing composition containing a cholesteric liquid crystal 2 encapsulated with a microcapsule wall 3, a cholesteric liquid crystal 4 encapsulated with a microcapsule wall 5, and a resin member 1 in which the cholesteric liquid crystals 2 and 4 are dispersed and held.

Furthermore, a liquid crystal-containing composition 10 may be a slurry composition that contains a cholesteric liquid crystal 2 encapsulated with a microcapsule wall 3 and a cholesteric liquid crystal 4 encapsulated with a microcapsule wall 5 or may be an ink composition in which the slurry composition is mixed with a binder polymer (or a polymeric compound).

Although not shown in figure a liquid crystal-containing composition 10 according to the exemplary embodiment may have a configuration in which only a cholesteric liquid crystal 2 is microencapsulated and a cholesteric liquid crystal 4 is not microencapsulated (that is, a microcapsule wall 5 is not contained). Specific examples of the configuration include an embodiment in which a cholesteric liquid crystal 4 is dispersed around a microencapsulated cholesteric liquid crystal 2. Such a configuration may be obtained by, for example, dispersing the cholesteric liquid crystal 4, which is not microencapsulated, and the microencapsulated cholesteric liquid crystal 2 in an aqueous polyvinyl alcohol solution, and then applying the dispersion liquid and drying the resultant.

In the liquid crystal-containing composition 10 according to the exemplary embodiment of the invention, the peak wavelength of the selective reflection in the cholesteric liquid crystal 2 is from 600 nm to 800 nm (or from about 600 nm to about 800 nm) and the peak wavelength of the selective reflection in the cholesteric liquid crystal 4 is from 400 nm to 500 nm (or from about 400 nm to about 500 nm).

In the liquid crystal-containing composition 10 according to the exemplary embodiment of the invention, the content of the cholesteric liquid crystal 4 with respect to the total amount of the cholesteric liquid crystal (cholesteric liquid crystal 2 and cholesteric liquid crystal 4) is from 5 weight % to 40 weight % (or from 5 weight % to 40 weight %).

Since the liquid crystal-containing composition 10 of the exemplary embodiment of the invention has the above configuration, a display having higher whiteness may be achieved. The reasons for this are explained as follows.

A cholesteric liquid crystal has a property of selectively reflecting light of a specific wavelength, such that a color corresponding to the selective reflection peak wavelength can be observed. Therefore, as a method of displaying a white color using the cholesteric liquid crystal, a method using a mixture of cholesteric liquid crystal has been suggested, in which the mixture has peak wavelengths in wavelength regions of the three primary colors of light: red, blue, or green.

In a cholesteric liquid crystal microcapsule, in which a cholesteric liquid crystal is encapsulated in a microcapsule, the alignment direction of the cholesteric helical axis has a distribution due to the alignment force of the capsule wall interface, and thus the reflectivity increases at a shorter wavelength range than the selective reflection wavelength range of an uncapsulated cholesteric liquid crystal. In this case, when cholesteric liquid crystals each having a peak wavelength corresponding to red, blue, or green, are mixed for use, a white color tinged with blue is displayed. However, since the exemplary embodiment of the invention has the above-described structure (i.e., a cholesteric liquid crystal having a peak wavelength corresponding to green is not used and the content of a cholesteric liquid crystal having a peak wavelength corresponding to blue is in the above range), the reflectivity in a wavelength region corresponding to blue region does not readily excessively increase, and a display having higher whiteness may be obtained.

In the exemplary embodiment of the invention, as cholesteric liquid crystals, only the cholesteric liquid crystal 2 having a peak wavelength of selective reflection in the range of from about 600 nm to about 800 nm and the cholesteric liquid crystal 4 having a peak wavelength of selective reflection in the range of from about 400 nm to about 500 nm are used. Thus, the liquid crystal-containing composition includes the cholesteric liquid crystal 2 having a peak wavelength of selective reflection in the range of from about 600 nm to about 800 nm and the cholesteric liquid crystal 4 having a peak wavelength of selective reflection in the range of from about 400 nm to about 500 nm to about 500 nm as the only liquid crystals. Therefore, compared to when respective cholesteric liquid crystals having peak wavelengths corresponding to red, blue, and green, respectively, are mixed (an additive mixture of colors) for use, the number of production processes is small, and the production of the liquid crystal-containing composition and the liquid crystal display device is facilitated.

The liquid crystal-containing composition according to the exemplary embodiment of the invention is described below in detail. The reference numerals are omitted in the following explanation.

First, the cholesteric liquid crystal is described. A cholesteric liquid crystal is a liquid crystal material containing an optically-active compound, and is obtained by, for example, (1) a method of adding, for example, an optically-active compound referred to as a chiral dopant into a nematic liquid crystal, or (2) a method of using a liquid crystal material which itself is optically-active such as a cholesterol derivative. In the former case, examples of the nematic liquid crystal material include known nematic liquid crystal-containing compositions such as cyanobiphenyls, phenyl cyclohexanes, phenyl benzoates, cyclohexyl benzoates, azo methines, azobenzenes, pyrimidines, dioxanes, cyclohexyl cyclohexanes, stilbenes, and tolans. Examples of the chiral dopant include cholesterol derivatives and compounds having an optically-active group such as a 2-methylbutyl group.

The cholesteric liquid crystal may contain an additive such as a dye or particles. The cholesteric liquid crystal may be a gel prepared by using a crosslinkable polymer or a hydrogen-bonding gelling agent. The cholesteric liquid crystal may be either a high, middle, or low-molecular-weight liquid crystal, or may be a mixture thereof. The helical pitch of the cholesteric liquid crystal may be changed according to the type or addition amount of the chiral dopant, or the material of the liquid crystal. In order to acquire memory properties, the average particle diameter of the following cholesteric liquid crystal drops (including microcapsule) dispersed in a polymer is preferably at least three times larger than the helical pitch of the cholesteric liquid crystal.

The cholesteric liquid crystal contains, as the only liquid crystals, the first cholesteric liquid crystal having a peak wavelength of selective reflection in the range of from 600 nm to 800 nm and the second cholesteric liquid crystal having a peak wavelength of selective reflection in the range of from 400 nm to 500 nm as described above.

The content of the second cholesteric liquid crystal with respect to the entire cholesteric liquid crystal content is from 5 weight % to 40 weight % (or from about 5 weight % to about 40 weight %), preferably from 10 weight % to 35 weight % (or from about 10 weight % to about 35 weight %), and more preferably from 15 weight % to 25 weight % (or from about 15 weight % to about 25 weight %). When the content is in the above-mentioned range, redness and blueness are suppressed. Moreover, since the brightness of the second cholesteric liquid crystal tends to be lower than the brightness of the first cholesteric liquid crystal, it is preferable that the content of the second cholesteric liquid crystal is low, in order to increase the brightness of the entire liquid crystal-containing composition.

The microcapsule wall is further described below.

Examples of the method for preparing a microcapsule wall (that is, the method for forming a microcapsule of a cholesteric liquid crystal) include: (1) a phase separation method in which a liquid crystal is dispersed in a polymer solution, and then the solution is subjected to phase separation to form a film on the surfaces of liquid crystal drops; (2) a in-liquid drying method in which a polymer and a liquid crystal are dissolved in a cosolvent, the solution is dispersed in an aqueous phase solution, and the cosolvent is evaporated; (3) an interfacial polymerization method in which a mixed solution (organic phase solution) of a liquid crystal and an oil-soluble monomer A is dispersed in an aqueous phase, to which a water-soluble monomer B is added to react with the oil-soluble monomer A through interfacial polymerization, thereby forming a film; (4) an in situ polymerization method in which a monomer is dissolved in a liquid crystal or an aqueous phase solution, and polymerized by heating or the like to form a film through deposition of a polymer.

Phase Separation Method

Examples of the phase separation method include: a complex coacervation method in which an aqueous polymer solution containing two kinds of water-soluble polymers (for example, gelatin and gum arabic, protein and a polysaccharide, protein and protein, protein and nucleic acid, or a polysaccharide and nucleic acid) is separated into a dense phase and a dilute phase by controlling the pH or temperature; and a simple coacervation method in which a water-compatible organic solvent (for example, alcohol or acetone) is added into a solution of a water-soluble polymer such as polyvinyl alcohol, gelatin, or alkyl cellulose, and then subjected to phase separation.

In-Liquid Drying Method

The in-liquid drying method is conducted, for example, by dissolving a polymer together with a liquid crystal in a solvent having low boiling temperature, dispersing the solution in an aqueous phase solution, and then evaporating the solvent by heating or under reduced pressure. Examples of the combination of a polymer and a solvent include: a fluorine resin and a fluorine solvent such as a chlorofluorocarbon; or a methylene chloride and an acrylic resin, a urethane resin, a polyurea resin, or a polyester resin.

Interfacial Polymerization Method

In the interfacial polymerization method, examples of the oil-soluble monomer A include polyvalent compounds having, within a molecule thereof, plural functional groups such as an acid halide group, a haloformate group, an isocyanate group, an isothiocyanate group, a ketene group, a carbodiimide group, an epoxy group, a glycidyl ether group, an oxazoline group, an ethylene imine group, or a lactone group. Examples of the water-soluble monomer B include polyvalent compounds having, within a molecule thereof, plural functional groups such as an amine group, an alcohol group, a carboxylic acid group, a mercaptan group, or a phenol group.

In Situ Polymerization Method

Examples of the in situ polymerization method include: (1) a method of polymerizing an oil-soluble monomer A and monomer C; and (2) a method of using a monomer D such as a radical polymerizable monomer which is polymerizable per se. Examples of the monomer A of method (1) include the same monomers as the monomer A used in the interfacial polymerization method, and examples thereof include polyvalent compounds having, within a molecule thereof, plural functional groups such as an acid halide group, a haloformate group, an isocyanate group, an isothiocyanate group, a ketene group, a carbodiimide group, an epoxy group, a glycidyl ether group, an oxazoline group, an ethylene imine group, or a lactone group. Examples of the monomer C include polyvalent compounds having, within a molecule thereof, plural functional groups such as an amine group, an alcohol group, a carboxylic acid group, a mercaptan group, or a phenol group. Examples of the monomer D of method (2) include polyvalent epoxy compounds, polyvalent isocyanate compounds, and unsaturated carbohydrate compounds such as styrene, isoprene, butadiene, vinyl chloride, vinylidene chloride, acrylonitrile, acrylic acid derivatives, and methacrylic acid derivatives. In order to form a wall material in the aqueous phase, a water-soluble monomer such as melamine and formaldehyde may be used.

A wall material that forms the microcapsule wall preferably includes at least one material selected from a polyurethane and a polyurea, to achieve a display having a high whiteness. It is more preferable that the wall material includes a polyurea to which an alkyl group and/or a fluoroalkyl group is bonded directly or indirectly via a urethane bond, to achieve a display having a high whiteness.

Hereinafter a liquid crystal microcapsule having a microcapsule wall containing a polyurea to which an alkyl group and/or a fluoroalkyl group is bonded directly or indirectly via a urethane bond (hereinafter sometimes referred to as a "polyurea-containing liquid crystal microcapsule") will be described.

Examples of the method of producing the polyurea-containing liquid crystal microcapsule according to the exemplary embodiment of the invention include a first production method in which a polyurea is produced by reaction of a polyisocyanate, water, and an alignment material containing a compound having a hydroxyl group and at least one of an alkyl group or a fluoroalkyl group.

Specifically, in the first production method, an organic phase solution is obtained by mixing a liquid crystal, an alignment material, and a polyisocyanate. The organic phase solution is then dispersed in an aqueous phase solution to form a dispersion liquid. The dispersion liquid is then heated. Through these processes, a polyurea, which is obtained by reaction of the alignment material, the polyisocyanate and water, forms a film, and the liquid crystal is encapsulated in the film.

In the first production method, the polyisocyanate in the organic phase solution reacts with water in the aqueous phase solution to generate a carbamic acid, which then generates an amine and carbon dioxide (Formula A). The resultant carbamic acid and the amine react with another polyisocyanate, respectively, to form a film of the polyurea (Formulae B and C).

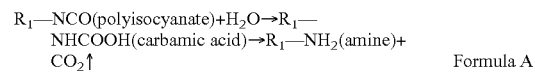  Formula A

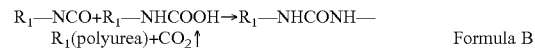  Formula B

  Formula C

In the above Formulae A to C, $R_1$ represents the other part of the polyisocyanate than one isocyanate group thereof (e.g., when the polyisocyanate is xylene diisocyanate, $R_1$ represents $OCN\text{—}CH_2\text{—}C_6H_4\text{—}CH_2\text{—}$; when the polyisocyanate is 1,6-hexane diisocyanate, $R_1$ represents $OCN\text{—}(CH_2)_6\text{—}$; and when the polyisocyanate is 4,4'-diphenylmethane diisocyanate, $R_1$ represents $OCN\text{—}C_6H_4\text{—}CH_2\text{—}C_6H_4\text{—}$).

In the first production method, the reaction of only one isocyanate group in the polyisocyanate is described in Formulae A to C. However, since the polyisocyanate has two or more isocyanate groups, in actuality, a polymer is generated in the second and third reactions of Formula A to C. A series of reactions in Formulae A to C proceed at the interface between the organic and aqueous phases, which results in the formation of a film at the interface. Once the film is formed, it inhibits contact between polyisocyanate and water, and the reaction rate therebetween is significantly decreased. Therefore, when there is an area where no film is formed, the reaction proceeds predominantly in that area, which results in formation of a uniform film.

The alkyl group or fluoroalkyl group (represented by $R_2$ in the following Formula D) is a homeotropic alignment group that allows a liquid crystal to be aligned perpendicular to the film surface. An alignment material, which contains a compound having a hydroxyl group and at least one of the alkyl group or fluoroalkyl group, is incorporated into the film via a urethane bond between the hydroxyl group and the isocyanate group of the polyisocyanate, thereby providing the film with homeotropic alignment properties (see the following Formula D). When the alignment material has a linking group between the homeotropic alignment group and the hydroxyl group, the alkyl group and/or the fluoroalkyl group as the homeotropic alignment group is incorporated into the film via an indirect binding with a urethane bond, thereby providing the film with homeotropic alignment properties (see the following Formula E).

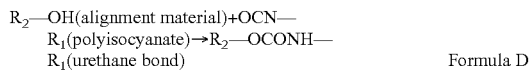

Formula D

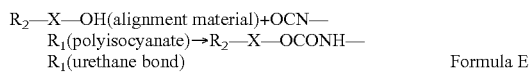

Formula E

In Formulae D and E, $R_1$ is defined in the same manner as described above $R_2$ represents a homeotropic alignment group such as an alkyl group or a fluoroalkyl group. X represents a linking group, which connects the alkyl and/or fluoroalkyl group to the hydroxyl group, such as a phenylene group -Ph-, an alkyl ester group —OCO—$(CH_2)_p$—, alkyl ether groups —O—$(CH_2)_p$—, —$(OCH_2CH_2)_p$—, and —$(OCH_2CH_2CH_2)_p$—, a phenyl ester group —OCO-Ph-, or a phenyl ether group —O-Ph-. p represents an integer of from 0 to 5, and, when p is 0, s and the hydroxyl group and at least one of the alkyl or fluoroalkyl group are bonded directly as shown in Formula D. In general, homeotropic alignment properties are deteriorated as p becomes larger, while the degree of the deterioration depends on the kind of the linking group represented by X. Therefore, p is preferably 5 or less.

The solubility of the alignment material in the liquid crystal is important, because the alignment material is to be dissolved in the liquid crystal when used. It is preferable to use a linking group having an ether group such as an alkyl ether group, since this linking group may provide flexibility to a compound and may improve solubility of the alignment material.

Examples of the method of producing the polyurea-containing liquid crystal microcapsule according to the exemplary embodiment of the invention include a second production method in which a polyurea is produced by reaction of a polyisocyanate, a polyamine, water, and an alignment material containing a compound having a hydroxyl group and at least one of an alkyl group or a fluoroalkyl group.

Specifically, in the second production method, an organic phase solution is prepared by mixing a liquid crystal, an alignment material, and a polyisocyanate. The organic phase solution is then dispersed in an aqueous phase solution to form a dispersion liquid. Subsequently, a polyamine is added to the dispersion liquid, and the resultant dispersion liquid is heated. Through these processes, a polyurea, which is obtained by reaction of the alignment material, the polyisocyanate, the polyamine and water, forms a film, whereby the liquid crystal is encapsulated in the film.

In the second production method, a reaction between the polyisocyanate and a polyamine occurs (Formula F) in addition to the reactions of the polyisocyanate, water and the alignment material in Formulae A to C.

$$R_1—NCO+NH_2—R_3(\text{polyamine}) \rightarrow R_1—NHCONH—R_3 \qquad \text{Formula F}$$

In Formula F, $R_1$ is defined in the same manner as described above. $R_3$ represents the other part of the polyamine than one amino group thereof (e.g., when the polyamine is ethylenediamine, $R_3$ is $H_2N—CH_2CH_2—$; and when the polyamine is diethylene triamine, $R_3$ is $H_2N—CH_2CH_2—N—CH_2CH_2—$).

In the early stage of polymerization, a polymer formed at the interface between the organic and aqueous phases, which does not have a considerable polymerization degree yet, easily diffuses into the organic phase due to thermal motion. Therefore, in the second production method, it is preferable to rapidly increase the polymerization degree and form a film. In general, the reaction rate of the reaction represented by Formula F is higher than those of the reactions represented by Formulae A to C, a uniform film may be generated more reliably therewith.

For the purpose of increasing the degree of polymerization rapidly, it is preferable that the polyamine is a high-molecular-weight polyamine. Among them, a polyallylamine having a primary amino group with high reactivity is more preferable.

In both the first and second production methods, when a compound having only one hydroxyl group is used as the alignment material, the crosslink density may be reduced. As a result, the glass transition temperature of a film may be decreased or the strength of a film may become insufficient. A method in which two or more hydroxyl groups are introduced to the alignment material may be effective for preventing these problems.

Hereinafter, each of materials used for the microcapsule wall according to the exemplary embodiment of the invention will be described in more detail.

First, the polyurea is defined as a polymeric compound in which monomers are bonded to each other via a urea bond —NHCONH—. Specifically, the polyurea can be obtained by reaction of polyisocyanate and water or reaction of a polyisocyanate and a polyamine.

Examples of the polyisocyanate include: (1) aliphatic polyisocyanates such as ethylene diisocyanate, tetramethylene diisocyanate, hexamethylene diisocyanate, dodecamethylene diisocyanate, 2,2,4-trimethylhexane diisocyanate, lysine diisocyanate, 2,6-diisocyanatemethylcaproate, bis(2-isocyanatoethyl)fumarate, bis(2-isocyanatoethyl)carbonate, or 2-isocyanatoethyl-2,6-diisocyanatohexanoate; (2) alicyclic polyisocyanates such as isophorone diisocyanate, dicyclohexylmethane diisocyanate, cyclohexylene diisocyanate, methyl cyclohexylene diisocyanate, or bis(2-isocyanatoethyl)-4-cyclohexene-1,2-dicarboxylate; (3) arylaliphatic polyisocyanates such as xylylene diisocyanate or diethylbenzene diisocyanate; (4) aromatic polyisocyanates such as tolylene diisocyanate, diphenylmethane diisocyanate, or naphthylene diisocyanate.

For the purpose of increasing the degree of polymerization rapidly and increasing the crosslink density of the polymer to obtain sufficient homeotropic alignment properties, using a polyisocyanate having three or more functional groups is preferable. Such polyisocyanate can be obtained as, for example, an adduct, isocyanurate, biuret, or allophanate of the above diisocyanates, and examples thereof include the following compounds.

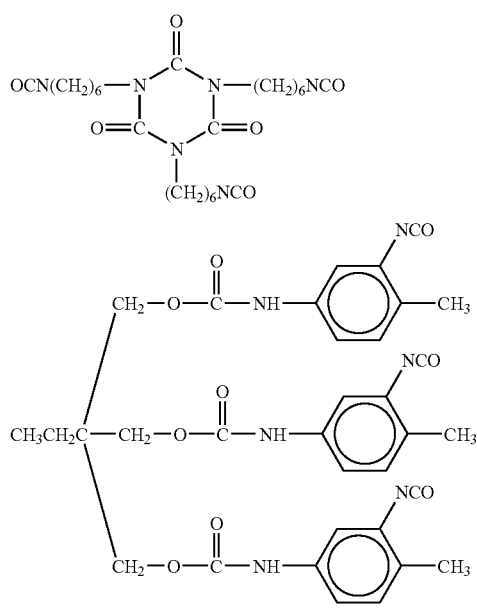

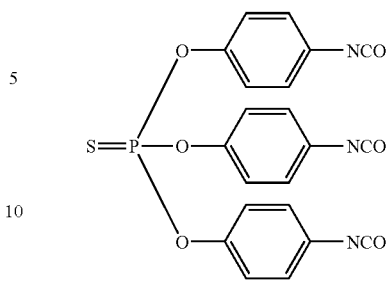

Examples of commercial products of the above compounds include CORONATE HX (trade name, manufactured by Nippon Polyurethane Industry Co., Ltd.), BURNOCK D-750 and CRISVON NX (trade names, manufactured by DIC Co.), DESMODUR L (trade name, manufactured by Sumika Bayer Urethane Co., Ltd.), CORONATE L (trade name, manufactured by Nippon Polyurethane Industry Co., Ltd.), TAKENATE D102 (trade name, manufactured by Mitsui Chemicals Inc.).

Examples of commercial products of the above compound include DESMODUR RF (trade name, manufactured by Sumika Bayer Urethane Co., Ltd.)

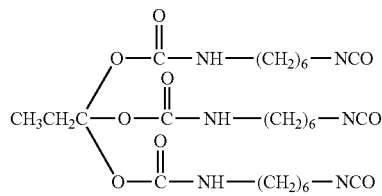

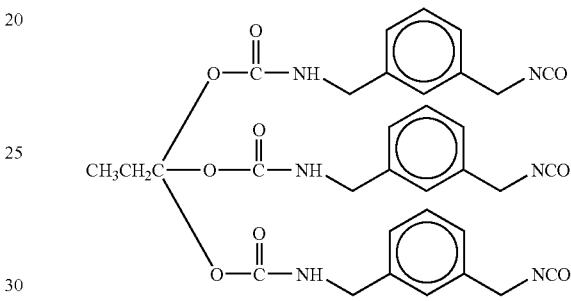

Examples of commercial products of the above compound include BURNOCK D-950 (trade name, manufactured by DIC Co.).

Examples of commercial products of the above compound include TAKENATE D110N (manufactured by Mitsui Chemicals Inc.).

When the polyisocyanate is formed from at least one of xylene diisocyanate, 1,3-bis(isocyanatomethyl)-cyclohexane, or isophorone diisocyanate, which is represented by the following Structural Formulae (1) to (3), respectively, or a derivative thereof, sufficient homeotropic alignment properties may be obtained. Here, the derivative represents an adduct, an isocyanurate, a biuret, or an allophanate.

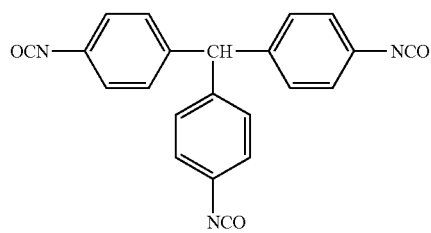

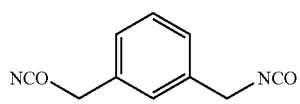

Structural Formula (1)

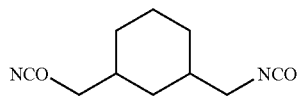

Structural Formula (2)

Structural Formula (3)

Examples of commercial products of the above compound include DESMODUR R (trade name, manufactured by Sumika Bayer Urethane Co., Ltd.).

The addition amount of the polyisocyanate may be from 1 part to 20 parts with respect to 100 (weight) parts of the liquid crystal. When the amount is less than 1 part, sufficient film strength may not be obtained and sufficient homeotropic alignment properties may not be obtained. When the amount exceeds 20 parts, the amount of the film within the liquid crystal microcapsule increases, whereby sufficient display performance may not be obtained.

As the homeotropic alignment material, a compound represented by the following Formula (I) can be used.

$$C_nF_mH_{(2n-m+1)}-X-Y \qquad \text{Formula (I)}$$

In Formula (I), $C_nF_mH_{(2n-m+1)}$ represents an alkyl group or a fluoroalkyl group. $C_nF_mH_{(2n-m+1)}$ represents an alkyl group when m is 0, and represents a fluoroalkyl group when m is not 0.

The alkyl group and the fluoroalkyl group are homeotropic alignment groups, and represented by the following formulae.

Alkyl group: $C_nH_{2n+1}-$

Fluoroalkyl group: $C_nF_mH_{2n-m+1}-(m \leqq 2n+1)$

Here, n indicates the chain length and is preferably an integer of from 4 to 30, and more preferably an integer of from 10 to 20. When n is less than 4, sufficient homeotropic alignment properties may not be obtained. When n exceeds 20, film strength may be significantly decreased. Since the homeotropic alignment effect is increased when the chain length is increased, larger n within the above range is preferable. In general, an alignment material having an alkyl group has higher compatibility with liquid crystal compared with that of an alignment material having a fluoroalkyl group. However, this is not always the case in low-polarity liquid crystals such as a fluorine-containing liquid crystal, and thus, alignment materials may be suitably selected depending on the purpose.

In Formula (I), X represents a linking group such as $-(OCH_2)_p-$, $-(OCH_2CH_2)_p-$, $-(OCH_2CH_2CH_2)_p-$, $-(COOCH_2CH_2)_p-$, $-(OCOCH_2CH_2)_p-$, -Ph-, or $-O-$Ph-, p represents an integer of from 0 to 5. In general, homeotropic alignment properties are deteriorated as p becomes larger, while the degree of the deterioration depends on the kind of the linking group represented by X. Therefore, p is preferably 5 or less. Among them, linking groups having an ether group such as $-(OCH_2)_p-$; $-(OCH_2CH_2)_p-$; or $-(OCH_2CH_2CH_2)_p-$ are preferably used in a wide range of liquid crystal materials, since these linking groups may provide flexibility with molecules of the alignment material and thus improve compatibility of the alignment material with crystal.

In Formula (I), Y represents a functional group that can bind to an isocyanate group, and may be a hydroxyl group $-OH$, or a glycerol monoester group such as $-COO-CH(CH_2OH)_2$ or $-COO-CH(OH)CH_2OH$. m represents an integer of from 0 to (2n+1), and n represents an integer of from 4 to 30.

The alignment material may be used in such an amount that the ratio of (number of hydroxyl groups in the alignment material)/(number of isocyanate groups) is preferably in the range of 5/100 to 70/100, and more preferably in the range of 20/100 to 50/100. When the amount of the alignment material is lower than the above range, sufficient homeotropic alignment properties may not be obtained. When the addition amount of the alignment material exceeds the above range, unreacted residues of the alignment material may be generated or crosslink density may be significantly reduced.

Examples of the polyamine include a low-molecular-weight polyamine such as ethylenediamine, diethylenetriamine, triethylenetetramine, tetraethylenepentamine, or hexamethylenediamine; and a high-molecular-weight polyamine such as chitosan, a polylysine, a Hoffmann-modified polyacrylamide, a polyvinylamine, a polyamidine, or a polyallylamine.

A high-molecular-weight polyamine is preferable, and a polyallylamine is more preferable, for the purpose of increasing the degree of polymerization rapidly and increasing the crosslinking density of the polymer to obtain sufficient homeotropic alignment properties. The high-molecular-weight polyamines, particularly polyallylamine, are also preferable so that unreacted residue may not readily dissolve in the liquid crystal and deterioration of electrical properties of the liquid crystal may be suppressed. Polyallylamines are commercially available as hydrochloride salts and in a free form. A free polyallylamine is preferable for obtaining favorable electrical properties.

The polyamine may have a highly reactive primary amino group. Since a polyamine having the primary amino group has a higher reactivity, a film with sufficient properties may be obtained.

The weight-average molecular-weight of the high-molecular-weight polyamine (e.g., polyallylamine) is preferably from 300 to 1,000,000, and more preferably from 300 to 30,000. When the weight-average-molecular weight is less than 300, homeotropic alignment properties may not be sufficiently improved. Homeotropic alignment properties tend to improve as the weight-average-molecular weight of polyamine increases. However, an excessively high molecular-weight may cause aggregation of the capsules during polymerization. Therefore, a weight-average-molecular-weight of 1,000,000 or less is preferable.

Among the polyamines, a polyallylamine having plural primary amino groups is preferable, and examples thereof include compounds represented by the following.

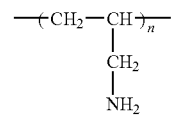

Here, n is an integer of from 15 to 20,000.

The polyamine may be used in an amount such that the ratio of the number of amino groups to the number of isocyanate groups is preferably in the range of 1/100 to 100/100. When the ratio is lower than the above range, a sufficient film may not be formed, and a sufficient homeotropic alignment effect may not be obtained. Since the amount of polyamine that reacts is only the amount that covers the surface of the dispersed phase, addition of an excess amount of polyamine may generate a greater amount of unreacted residues of polyamine, which may be wasteful.

The polyurea obtained by reaction of the above materials used for the microcapsule wall is preferably a polymeric compound obtained by reaction of at least the polyisocyanate, water, and, as the alignment material, at least one compound represented by Formula (I); or a polymeric compound obtained by reaction of at least the polyisocyanate, water, the polyamine, and, as the alignment material, at least one compound represented by Formula (I).

Hereinafter, the first and second production methods will be described in detail. The first production method includes a series of steps of (A1) preparing an organic phase solution by mixing a liquid crystal, an alignment material, and a polyisocyanate; (A2) preparing a dispersion liquid by dispersing the organic phase solution in an aqueous phase solution; and (A3) heating the resultant dispersion liquid.

In the process (A1), a solvent such as ethyl acetate, butyl acetate, methylethylketone, or toluene may be added to the organic phase solution to increase mutual solubility of the liquid crystal, alignment material, and polyisocyanate. The organic phase solution may be heated. Addition of solvent is effective in facilitating dispersion of the organic phase solution by lowering the viscosity thereof.

In the process (A2), dispersion may be carried out by using a rotary blade stirrer such as propeller-type, screw-type, paddle-type, or internal gear-type stirrer; an ultrasonic stirrer, a jet stirrer, a film emulsifier, or the like.

An emulsion stabilizer may be added to the aqueous phase to prevent the fusion of dispersed organic phase droplets. Examples of the emulsion stabilizer include surfactants such as an alkylbenzenesulfonate or a polyethylene oxide alkylester; and protective colloids such as a polyvinylalcohol, an alkylcellulose, a hydroxycellulose, or gelatin.

The heating in process (A3) is a step of reacting the polyisocyanate and water, as well as reacting the polyisocyanate and the alignment material. The heating temperature and period may be suitably selected according to the materials used such that the reactions progress sufficiently. In general, the heating temperature is approximately from 50 to 100° C. and the heating period is approximately from 1 hour to 20 hours.

The second production method includes a series of steps of (B1) preparing an organic phase solution by mixing a liquid crystal, an alignment material, and a polyisocyanate; (B2) preparing a dispersion liquid by dispersing the organic phase solution in an aqueous phase solution; (B3) adding a polyamine to the dispersion liquid; and (B4) heating the resultant dispersion liquid.

Steps (B1), (B2), and (B4) correspond to steps (A1), (A2), and (A3), respectively. In step (B3), in which the polyamine is added, the dispersion may be stirred well and generated heat may be released as appropriate in order to have the reaction progress evenly, since the reaction between the polyamine and the polyisocyanate is very rapid.

The liquid crystal microcapsule according to the exemplary embodiment of the invention described above is used as a liquid crystal microcapsule film, which is formed by dispersing the liquid crystal microcapsule in a resin material (or solution thereof) and coating the resultant dispersion liquid on a substrate. Examples of the resin material include a polymer such as a polyvinylalcohol, an alkylcellulose, gelatin, a polyester, a polyacrylate, a polymethacrylate, a polyvinyl, a polyurethane, an epoxy, a polycarbonate, a polyolefin, and a silicone; and metal oxides that are produced in a sol-gel reaction of metal alkoxides. Among them, a transparent resin material is preferable.

The liquid crystal-containing composition according to the exemplary embodiment of the invention can be applied to a substrate by any methods. Examples of the methods include a printing method such as screen printing, letterpress printing, gravure printing, planographic printing, or flexographic printing; and coating method such as spin coating, bar coating, dip coating, roll coating, knife coating, or die coating.

The liquid crystal-containing composition according to the exemplary embodiment of the invention can be used, for example, in display devices, image/information-recording devices, spatial light modulators, and the like. In particular, it is preferable to use the liquid crystal-containing compound of the exemplary embodiment of the invention in display devices such as liquid crystal display devices. Hereinafter, the liquid crystal display device according to the exemplary embodiment of the invention will be described.

Liquid Crystal Display Device

First Exemplary Embodiment

Figure 3:
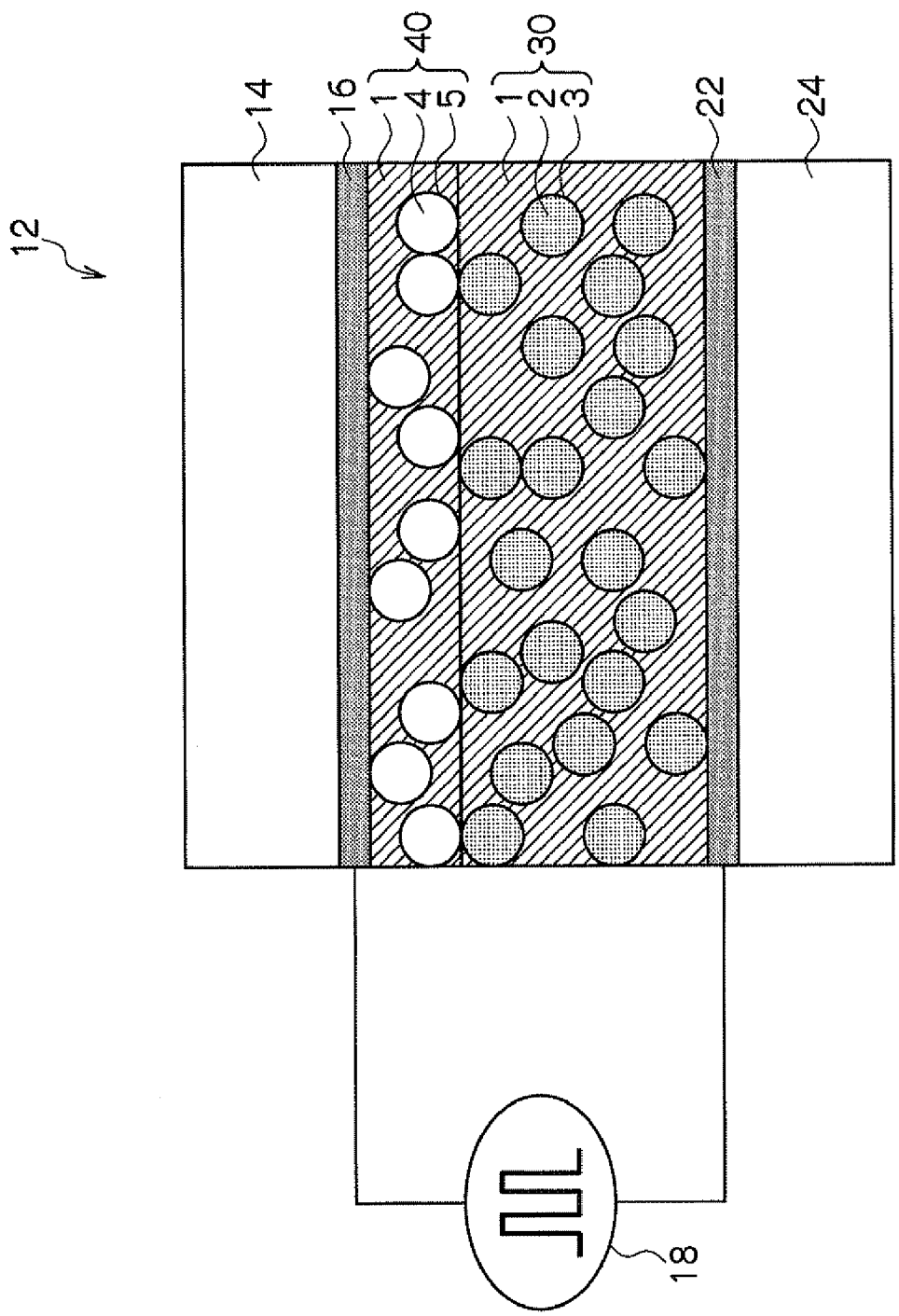
FIG. 3 is a schematic configuration diagram illustrating a liquid crystal display device according to a first exemplary embodiment.

FIG. 3 is a schematic configuration diagram illustrating a liquid crystal display device according to a first exemplary embodiment. The liquid crystal display device according to the first exemplary embodiment has a configuration in which a first display layer and a second display layer are superposed on each other, the first cholesteric liquid crystal having a peak wavelength of selective reflection in the range of from 600 nm to 800 nm (or from about 600 nm to about 800 nm) is contained in the first display layer, the second cholesteric liquid crystal having a peak wavelength of selective reflection in the range of 400 nm to 500 nm (or from about 400 nm to about 500 nm) is contained in the second display layer, and the first and second cholesteric liquid crystals being the only liquid crystals. More specifically, the liquid crystal display device according to the first exemplary embodiment has a laminated structure in which the second cholesteric liquid crystal is contained in a display layer that is different from a display layer that contains the first cholesteric liquid crystal.

In a liquid crystal display device 12 according to the first exemplary embodiment, a substrate 14, an electrode 16, a display layer 40 (second display layer), a display layer 30 (first display layer), an electrode 22, and a substrate 24 are superposed on each other in this order from the display surface side (the side from which an image is observed). The liquid crystal display device 12 further includes a drive circuit 18 that supplies a voltage pulse to the display layers 30 and 40 through the electrodes 16 and 22.

The substrates 14 and 24 are members for holding the functional layers therebetween and maintaining the structure of the liquid crystal display device 12. The substrates 14 and 24 are sheet-shaped materials having strength enough to resist against an external force. The substrate 14 provided at the display surface side transmits at least incident light. It is preferable for the substrates 14 and 24 to have flexibility.

Specific examples of a material forming the substrates 14 and 24 include inorganic sheets (e.g., glass, ceramic, or silicone sheets) and polymeric films (e.g., PET (polyethylene terephthalate), polysulfone, PES (polyether sulphone), PC (polycarbonate), polyethylenenaphthalate, polyethylene, polystyrene, or polyimide films).

When the functional layers include organic materials and a heat treatment process at a high temperature is not conducted, it is effective to use a light-transmissive high polymeric film substrate as the substrate 14 in consideration of flexibility of the substrate, ease of shaping, or cost.

The thickness of each of the substrates 14 and 24 is preferably in the range of from 50 μm to 500 μm.

The electrodes 16 and 22 are members for applying a voltage applied from the drive circuit 18 to the functional layers in the liquid crystal display device 12. Therefore, the electrodes 16 and 22 have electrical conductivity, and the electrode 16 provided at the display surface side transmits at least incident light. The "electric conduction" and "electrical conductivity" as used in the exemplary embodiment of the invention refer to a sheet resistance of 500 Ω/sq or lower.

Examples of each of the electrodes 16 and 22 include an electrical conductive thin films including a metal (e.g., gold or aluminum), a metal oxide (e.g., indium oxide, tin oxide, or indium tin oxide (ITO)), or an electrical conductive organic polymer (e.g., polythiophene or polyaniline). On the front side surface and/or the back side surface of each of the electrodes 16 and 22, a known functional film, such as an adhesion-promoting film, a light-reflection preventing film, or a gas barrier film, may be formed.

The electrodes 16 and 22 may be formed by sputtering on the substrates 14 and 24, respectively. The electrodes 16 and 22 do not necessarily need to be formed by sputtering and may be formed by printing, CVD, deposition, or the like.

The display layers 30 and 40 are sandwiched between the electrodes 16 and 22. Specifically, the display layers 30 and 40 are sandwiched between the substrates 14 and 24, on which the electrodes 16 and 22 are formed, respectively, and are supplied with a voltage pulse by the drive circuit 18, whereby displaying is performed.

The display layer 30 contains a cholesteric liquid crystal 2 (a first cholesteric liquid crystal). Specifically, in the display layer 30, the cholesteric liquid crystal 2 encapsulated with a microcapsule wall 3 are dispersed and held in the resin member 1.

The display layer 40 contains a cholesteric liquid crystal 4 (a second cholesteric liquid crystal). Specifically, the cholesteric liquid crystal 4 encapsulated with the microcapsule wall 5 are dispersed and held in the resin member 1.

The details of the resin member 1, the cholesteric liquid crystal 2, the microcapsule wall 3, the cholesteric liquid crystal 4, and the microcapsule wall 5 are the same as those described above.

In the first exemplary embodiment, the liquid crystal-containing composition of the above-described exemplary embodiment is used as a liquid crystal-containing composition composed of the display layer 30 and the display layer 40.

The content of the cholesteric liquid crystal 4 is from 5 weight % to 40 weight % (or from about 5 weight % to about 40 weight %) with respect to the total amount of the cholesteric liquid crystal including the cholesteric liquid crystal 2 contained in the display layer 30 and the cholesteric liquid crystal 4 contained in the display layer 40.

Therefore, a display having higher whiteness may be obtained in the liquid crystal display device of the exemplary embodiment of the invention.

In the first exemplary embodiment, the display layers 30 and 40 each have a laminated structure and the display layer 40 is superposed on the display surface side relative to the display layer 30. The cholesteric liquid crystal 4 is concentrated at a side nearer to an observer relative to the cholesteric liquid crystal 2 for reducing the content of the cholesteric liquid crystal 4, which tends to have lower brightness than that of the cholesteric liquid crystal 2. This allows a display having higher whiteness, and improvements in both whiteness and brightness. Furthermore, since brightness is improved in the first exemplary embodiment, sufficient brightness may be obtained at a relatively low driving voltage compared with a mixed type liquid crystal display element described below.

In the first exemplary embodiment, a light absorption member may be provided, as a display background, between the display layer 30 and the electrode 22, or between the electrode 22 and the substrate 24, or at the back side surface of the substrate 24, for example. A laminate layer that compensates for uneven portions and that provides adhesion when each layer is bonded to each other, may be provided as required.

In the first exemplary embodiment, the display layer 40 is provided at the display surface side relative to the display layer 30, but this is not limiting, and the display layer 30 may be provided at the display surface side relative to the display layer 40.

In the first exemplary embodiment, the resin member 1 is used in the display layers 30 and 40, but this is not limiting, and different resin members may be employed for each display layer, or the resin member 1 may not be used at all.

In the first exemplary embodiment, the cholesteric liquid crystal 4 encapsulated with the microcapsule wall 5 is used, but this is not limiting, and a configuration in which cholesteric liquid crystal 4 is not microencapsulated may be used (for example, a configuration may be used in which the cholesteric liquid crystal 4 is dispersed around the cholesteric liquid crystal 2 which is encapsulated with the microcapsule wall 3).

The methods of driving the liquid crystal display device according to the first exemplary embodiment include known driving methods such as (1) a segment driving method of driving liquid crystal held between two electrodes patterned in the display shape, (2) a simple matrix driving method of holding a liquid crystal-containing composition between a pair of cross (for example, orthogonal) striped electrode substrates, scanning the respective lines one by one, and thus forming an image, (3) an active matrix driving method of placing active devices such as a thin film transistor, a thin film diode, or a MIM (metal-insulator-metal) device in each active device and driving the liquid crystal by the active device, (4) an optical driving method of superposing a photoconductor layer and holding them between a pair of electrodes, forming an image while projecting an optical image and applying a voltage at the same time, (5) a thermal driving method of holding a liquid crystal-containing composition between a pair of electrodes, inducing transition to the P alignment by application of a voltage, and then forming an image by heating it to a phase transition temperature or more, for example, by a laser or a thermal head, and (6) an electrostatic driving method of coating a liquid crystal-containing composition on an electrode substrate and forming an image, for example, with a stylus head or an ion head.

Second Exemplary Embodiment

Figure 4:
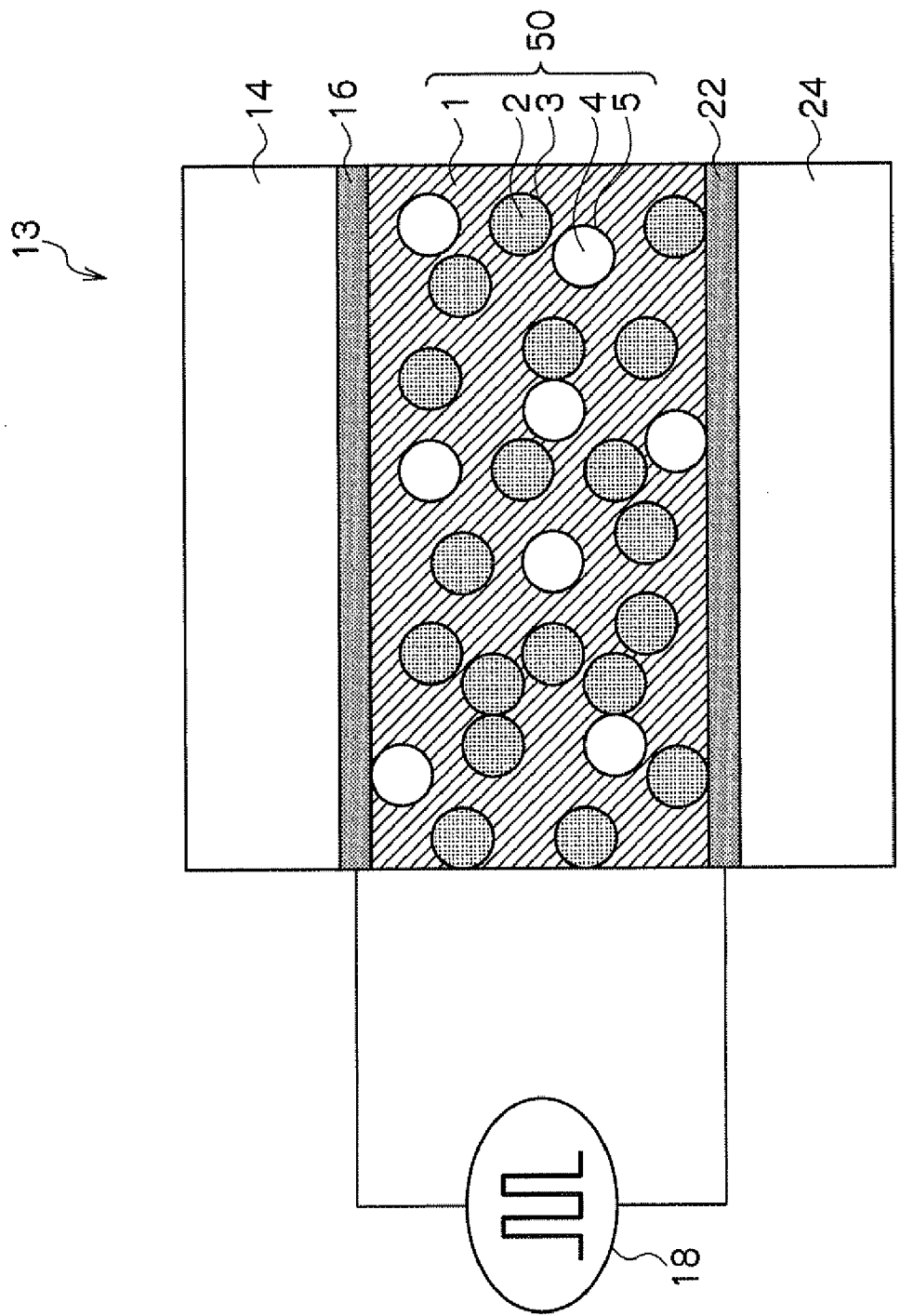
FIG. 4 is a schematic configuration diagram illustrating a liquid crystal display device according to a second exemplary embodiment.

FIG. 4 is a schematic configuration diagram illustrating a liquid crystal display device according to a second exemplary embodiment of the invention. The liquid crystal display device according to the second exemplary embodiment has a configuration in which the first cholesteric liquid crystal having a peak wavelength of selective reflection in the range of from 600 nm to 800 nm and the second cholesteric liquid crystal having a peak wavelength of selective reflection in the range of from 400 nm to 500 nm as the only liquid crystals are contained in a single display layer. More specifically, the liquid crystal display device according to the second exemplary embodiment is a mixed type liquid crystal display device in which the first cholesteric liquid crystal and the second cholesteric liquid crystal are contained in the same display layer.

A liquid crystal display device 13 according to the second exemplary embodiment has a configuration in which the substrate 14, the electrode 16, a display layer 50, the electrode 22, and the substrate 24 are superposed on each other in this order from the display surface side (the side from which an image is observed). The liquid crystal display device 13 further includes the drive circuit 18 that supplies a voltage pulse to the display layer 50 through the electrodes 16 and 22.

The display layer 50 is sandwiched between the substrates 14 and 24, on which the electrodes 16 and 22 are formed, respectively, and is supplied with a voltage pulse by the drive circuit 18, whereby displaying is performed.

In the display layer 50, the cholesteric liquid crystal 2 encapsulated with the microcapsule wall 3 and the cholesteric liquid crystal 4 encapsulated with the microcapsule wall 5 are dispersed and held in the resin member 1.

The liquid crystal display device 13 according to the second exemplary embodiment is the same as that of the first exemplary embodiment except the features described above, and thus the descriptions thereof are omitted.

In the second exemplary embodiment, the liquid crystal-containing composition of the above-described exemplary embodiment is used as a liquid crystal-containing composition forming the display layer 50. More specifically, the content of the cholesteric liquid crystal 4 is from 5 weight % to 40 weight % (or from about 5 weight % to about 40 weight %) with respect to the total amount of the cholesteric liquid crystal including the cholesteric liquid crystal 2 and the cholesteric liquid crystal 4 contained in the display layer 50.

Therefore, a display having higher whiteness may be obtained in the liquid crystal display device of the exemplary embodiment of the invention.

In the second exemplary embodiment, since the cholesteric liquid crystal 2 and the cholesteric liquid crystal 4 are mixed in the display layer 50, the number of production processes is small and the production of the liquid crystal display device may be facilitated compared with a liquid crystal display device having a laminated structure.

EXAMPLES

Hereinafter, the present invention will be explained with reference to examples in details, but the invention is not limited to these examples.

Examples A

Examples A1 to A7 and Comparative Examples A1 and A2

Production of First Cholesteric Liquid Crystal (Cholesteric Liquid Crystal 1)

A nematic liquid crystal having a birefringence of 0.25, a chiral dopant R811 (trade name, manufactured by Merck & Co.) Inc.), and a chiral dopant R1011 (trade name, manufactured by Merck & Co., Inc.) are mixed in a weight ratio of 86.3:11.0:2.8, thereby obtaining a cholesteric liquid crystal 1 that selectively reflects a wavelength of 620 nm (red).

Preparation of Liquid Crystal Microcapsule Coating solution 1

An organic phase solution having the following composition is prepared.

Cholesteric liquid crystal 1: 1 g

Polyisocyanate: TAKENATE D110N (manufactured by Mitsui Chemicals Inc.): 0.13 g

Alignment material: diethylene glycol hexadecane ether ($C_{16}H_{33}$—$(OCH_2CH_2)_2$—OH): 0.05 g Solvent: ethyl acetate: 10 g The obtained organic phase solution is poured into 100 g of a 1% aqueous polyvinyl alcohol solution, and then the mixture is dispersed by using a propeller stirrer to give a dispersion liquid having particles of an average diameter of 7 μm. Subsequently, 2.5 g of a 2% aqueous solution of polyallylamine (trade name: PAA-H10C, weight-average-molecular-weight: 100,000; manufactured by Nitto Boseki Co., Ltd.) is added to the dispersion liquid, and then the mixed dispersion liquid is allowed to react in a container placed in a water bath at 85° C. for 2 hours. Microscopic observation reveals that a liquid crystal microcapsule having a uniform film is obtained.

Then, the resultant dispersion liquid is concentrated by precipitating liquid crystal microcapsules in the dispersion liquid using a centrifugal separator and removing the supernatant liquid. After addition of purified water and agitation, the dispersion liquid is concentrated twice in a manner similar to the above to wash the liquid crystal microcapsules. An aqueous polyvinyl alcohol solution is then added as a binder to the concentrated dispersion liquid to prepare a liquid crystal microcapsule coating solution 1. The ratio of the liquid crystal microcapsule to the polyvinyl alcohol in the liquid crystal microcapsule coating solution 1 is adjusted to a ratio of 75:25 by weight.

Production of Second Cholesteric Liquid Crystal (Cholesteric Liquid Crystal 2)

A nematic liquid crystal having a birefringence of 0.25, a chiral dopant R811 (trade name, manufactured by Merck & Co., Inc.), and a chiral dopant R1011 (trade name, manufactured by Merck & Co., Inc.) are mixed in a weight ratio of 82.6:13.9:3.5, thereby obtaining a cholesteric liquid crystal 2 that selectively reflects a wavelength of 490 nm (blue).

Preparation of Liquid Crystal Microcapsule Coating Solution 2

A liquid crystal microcapsule coating solution 2 is prepared in a manner similar to that of the liquid crystal microcapsule coating solution 1, except that the cholesteric liquid crystal 2 is used in place of the cholesteric liquid crystal 1. The ratio of the liquid crystal microcapsule to the polyvinyl alcohol in the liquid crystal microcapsule coating solution 2 is adjusted to a ratio of 75:25 by weight.

Production of Liquid Crystal Display Devices A1 to A9

The liquid crystal microcapsule coating solution 1 is applied with an applicator onto a polyethylene terephthalate (PET) substrate provided with an indium tin oxide (ITO) electrode, thereby obtaining a liquid crystal microcapsule film 1 having a dry film thickness shown in Table 1. Thereafter, the liquid crystal microcapsule coating solution 2 is applied onto the liquid crystal microcapsule film 1, thereby obtaining a liquid crystal microcapsule film 2 having a dry film thickness shown in Table 1. The combined coating thickness of the liquid crystal microcapsule films 1 and 2 is adjusted to be 26 μm for each of A1 to A9.

Subsequently, another substrate provided with an electrode is prepared as a counter substrate. To the substrate, a black coating material in which carbon black is added to an aqueous polyvinyl alcohol solution is applied so that the dry film thickness is 3 μm. Furthermore, a two-component urethane adhesive is applied thereto to a thickness of 3 μm. Then, the resultant is bonded to the above liquid crystal microcapsule film having a laminated structure (a film in which the liquid crystal microcapsule film 1 is superposed on the liquid crystal microcapsule film 2), thereby obtaining liquid crystal display devices A1 to A9.

The content of the cholesteric liquid crystal 2 with respect to the total cholesteric liquid crystal content in the liquid crystal display devices A1 to A9 is shown in Table 1.

Comparative Example A3

A liquid crystal display device A10 is obtained in a manner similar to that of the liquid crystal display device A1, except that the dry film thickness of the liquid crystal microcapsule film 1 is adjusted to be 26 μm and that the liquid crystal microcapsule coating solution 2 is not applied.

Production of Third Cholesteric Liquid Crystal (Cholesteric Liquid Crystal 3)

A nematic liquid crystal having a birefringence of 0.25, a chiral dopant R811 (trade name, manufactured by Merck & Co., Inc.), and a chiral dopant R1011 (trade name, manufactured by Merck & Co., Inc.) are mixed in a weight ratio of 84.1:12.7:3.2, thereby obtaining a cholesteric liquid crystal 3 that selectively reflects a wavelength of 540 nm (green).

Preparation of Liquid Crystal Microcapsule Coating Solution 3

A liquid crystal microcapsule coating solution 3 is prepared in a manner similar to that of the liquid crystal microcapsule coating solution 1, except that the cholesteric liquid crystal 3 is used in place of the cholesteric liquid crystal 1. The ratio of the liquid crystal microcapsule to the polyvinyl alcohol in the liquid crystal microcapsule coating solution 3 is adjusted to be 75:25 by weight.

Production of Liquid Crystal Display Device A11

The liquid crystal microcapsule coating solution 1 is applied with an applicator onto a polyethylene terephthalate (PET) substrate provided with an indium tin oxide (ITO) electrode, thereby obtaining a liquid crystal microcapsule film 1 having a dry film thickness of 8.6 μm. Thereafter, the liquid crystal microcapsule coating solution 3 is applied onto the liquid crystal microcapsule film 1, thereby obtaining a liquid crystal microcapsule film 3 having a dry film thickness of 8.7 μm Subsequently, the liquid crystal microcapsule coating solution 2 is applied onto the liquid crystal microcapsule film 3, thereby obtaining a liquid crystal microcapsule film 2 having a dry film thickness of 8.7 μm. The combined coating thickness of the liquid crystal microcapsule films 1, 2 and 3 is adjusted to be 26 μm.

Subsequently, another substrate having an electrode is prepared as a counter substrate. To the substrate, a black coating material in which carbon black is added to an aqueous polyvinyl alcohol solution is applied so that the dry film thickness is 3 μm. Furthermore, a two-component urethane adhesive is applied thereto to a thickness of 3 μm. Then, the resultant is bonded to the above liquid crystal microcapsule film having a laminated structure (a film in which the liquid crystal microcapsule films 1, 2 and 3 are superposed on each other in this order), thereby obtaining liquid crystal display device A11.

The content of the cholesteric liquid crystals 2 and 3 with respect to the total amount of the cholesteric liquid crystal in the liquid crystal display device A11 is shown in Table 1.

Examples B

Example B1

Preparation of Liquid Crystal Microcapsule Mixture Coating Solution 1

20 parts by weight of the liquid crystal microcapsule coating solution 2 is added to 80 parts by weight of the liquid crystal microcapsule coating solution 1, and the resultant solution is mixed, thereby preparing a liquid crystal microcapsule mixture coating solution 1.

Production of Liquid Crystal Display Device B1

The liquid crystal microcapsule mixture coating solution 1 is applied with an applicator onto a polyethylene terephthalate (PET) substrate provided with an indium tin oxide (ITO) electrode, thereby obtaining a liquid crystal microcapsule mixture film 1 having a dry film thickness of 26 μm. Subsequently, another substrate having an electrode is prepared as a counter substrate. To the substrate, a black coating material in which carbon black is added to an aqueous polyvinyl alcohol solution is applied so that the dry film thickness is 3 μm. Furthermore, a two-component urethane adhesive is applied thereto to a thickness of 3 μm Then, the resultant is bonded to the above liquid crystal microcapsule mixture film 1, thereby obtaining a liquid crystal display device B1.

The content of the cholesteric liquid crystal 2 with respect to the total amount of the cholesteric liquid crystal in the liquid crystal display device B1 is 20 weight %.

Example B2

Preparation of Liquid Crystal Microcapsule Mixture Coating Solution 2

30 parts by weight of the liquid crystal microcapsule coating solution 2 is added to 70 parts by weight of the liquid crystal microcapsule coating solution 1, and the resultant solution is mixed, thereby preparing a liquid crystal microcapsule mixture coating solution 2.

Production of Liquid Crystal Display Device B2

The liquid crystal microcapsule coating solution 2 is applied with an applicator onto a polyethylene terephthalate (PET) substrate provided with an indium tin oxide (ITO) electrode, thereby obtaining a liquid crystal microcapsule mixture film 2 having a dry film thickness of 26 μm. Subsequently, another substrate having an electrode is prepared as a counter substrate. To the substrate, a black coating material in which carbon black is added to an aqueous polyvinyl alcohol solution is applied so that the dry film thickness is 3 μm. Furthermore, a two-component urethane adhesive is applied thereto to a thickness of 3 μm. Then, the resultant is bonded to the above liquid crystal microcapsule mixture film 2, thereby obtaining a liquid crystal display device B2.

The content of the cholesteric liquid crystal 2 with respect to the weight total amount of the cholesteric liquid crystal in the liquid crystal display device B2 is 30 weight %.

Comparative Example B1

Preparation of Liquid Crystal Microcapsule Mixture Coating Solution 3

33.3 parts by weight of the liquid crystal microcapsule coating solution 2 and 33.3 parts by weight of the liquid crystal microcapsule coating solution 3 are added to 33.4 parts by weight of the liquid crystal microcapsule coating solution 1, and the resultant solution is mixed, thereby preparing a liquid crystal microcapsule mixture coating solution 3.

Production of Liquid Crystal Display Device B3

The liquid crystal microcapsule coating solution 3 is applied with an applicator onto a polyethylene terephthalate (PET) substrate provided with an indium tin oxide (ITO) electrode, thereby obtaining a liquid crystal microcapsule mixture film 3 having a dry film thickness of 26 μm. Subsequently, another substrate having an electrode is prepared as a counter substrate. To the substrate, a black coating material in which carbon black is added to an aqueous polyvinyl alcohol solution is applied so that the dry film thickness is 3 μm. Furthermore, a two-component urethane adhesive is applied thereto to a thickness of 3 μm. Then, the resultant coated counter substrate is bonded to the above liquid crystal microcapsule mixture film 3, thereby obtaining a liquid crystal display device B3.

The contents of the cholesteric liquid crystals 2 and 3 with respect to the total amount of the cholesteric liquid crystal in the liquid crystal display device B3 are 33.3 weight % and 33.3 weight %, respectively.

Example C

Example C1

Preparation of Liquid Crystal Microcapsule Coating Solution 4

An organic phase solution having the following composition is prepared.
Cholesteric liquid crystal 1: 1 g
Polyisocyanate: TAKENATE D110N (manufactured by Mitsui Chemicals Inc.): 0.13 g
Solvent: ethyl acetate: 10 g The obtained organic phase solution is poured into 100 g of a 1% aqueous polyvinyl alcohol solution, and then the mixture is dispersed by using a propeller stirrer to give a dispersion liquid having particles of an average diameter of 7 μm. The obtained dispersion liquid is allowed to react in a container placed in a water bath at 85° C. for 2 hours.

Then, the resultant dispersion liquid is concentrated by precipitating liquid crystal microcapsules in the dispersion liquid using a centrifugal separator and removing the supernatant liquid. After addition of purified water and agitation, the dispersion liquid is concentrated twice in a manner similar to the above to wash the liquid crystal microcapsules. An aqueous polyvinyl alcohol solution is then added as a binder to the concentrated dispersion liquid to prepare a liquid crystal microcapsule coating solution 4. The ratio of the liquid crystal microcapsule to the polyvinyl alcohol in the liquid crystal microcapsule coating solution 4 is adjusted to be 75:25 by weight.

Preparation of Liquid Crystal Microcapsule Coating Solution 5

A liquid crystal microcapsule coating solution 5 is prepared in a manner similar to that of the liquid crystal microcapsule coating solution 4, except that the cholesteric liquid crystal 2 is used in place of the cholesteric liquid crystal 1. The ratio of the liquid crystal microcapsule to the polyvinyl alcohol in the liquid crystal microcapsule coating solution 5 is adjusted to be 75:25 by weight.

Production of Liquid Crystal Display Device C1

A liquid crystal display device C1 is obtained in a manner similar to that of the liquid crystal display device A1, except that the liquid crystal microcapsule coating solutions 4 and 5 are used in place of the liquid crystal microcapsule coating solutions 1 and 2, respectively.

The content of the cholesteric liquid crystal 2 with respect to the total amount of the cholesteric liquid crystal in the liquid crystal display device C1 is shown in Table 3.

Example C2

Preparation of Liquid Crystal Microcapsule Coating Solution 6

An organic phase solution having the following composition is prepared.
Cholesteric liquid crystal 1: 0.85 g
Monomer: $CH_2\!=\!C(CH_3)COOCH_2(CH_2)_{16}CH_3$: 0.060 g
Monomer: $CH_2\!=\!CHCOOCH_2C_2F_5$: 0.045 g
Monomer: $C_2H_5C(CH_2OCOCH\!=\!CH_2)_3$: 0.045 g
Radical polymerization initiator: azoisobutyronitrile: 0.003 g
Solvent: ethyl acetate: 10 g The obtained organic phase solution is poured into 100 g of a 1% aqueous polyvinyl alcohol solution, and then the mixture is dispersed by using a propeller stirrer to give a dispersion liquid having particles of an average diameter of 10 μm. The obtained dispersion liquid is heated at 90° C. for 6 hours in a nitrogen environment for radical polymerization of the monomers, thereby obtaining a liquid crystal microcapsule.

Then, the resultant dispersion liquid is concentrated by precipitating liquid crystal microcapsules in the dispersion liquid using a centrifugal separator and removing the supernatant liquid. After addition of purified water and agitation, the dispersion liquid is concentrated twice in a manner similar to the above to wash the liquid crystal microcapsules. An aqueous polyvinyl alcohol solution is then added as a binder to the concentrated dispersion liquid to prepare a liquid crystal microcapsule coating solution 6. The ratio of the liquid crystal microcapsule to the polyvinyl alcohol in the liquid crystal microcapsule coating solution 6 is adjusted to be 75:25 by weight ratio.

Preparation of Liquid Crystal Microcapsule Coating Solution 7

A liquid crystal microcapsule coating solution 7 is prepared in a manner similar to that of the liquid crystal microcapsule coating solution 6, except that the cholesteric liquid crystal 2 is used in place of the cholesteric liquid crystal 1. The ratio of the liquid crystal microcapsule to the polyvinyl alcohol contained in the liquid crystal microcapsule coating solution 7 is adjusted to be 75:25 by weight.

Production of Liquid Crystal Display Device C2

A liquid crystal display device C2 is obtained in a manner similar to that of the liquid crystal display device A1, except that the liquid crystal microcapsule coating solutions 6 and 7 are used in place of the liquid crystal microcapsule coating solutions 1 and 2, respectively.

The content of the cholesteric liquid crystal 2 with respect to the total amount of the cholesteric liquid crystal in the liquid crystal display device C2 is shown in Table 3.

Evaluation

Evaluation of Reflectivity $R_{460}$(%) at 460 nm

A burst pulse having a symmetrical square wave of a frequency of 1 kHz a voltage of 600 V, and a length of 200 ms is applied between the upper and lower electrodes of the obtained liquid crystal display devices. Then, the reflectivity $R_{460}$(%) at 460 nm after the application of the pulse is measured. The results thereof are shown in Tables 1 to 3. The reflectivity $R_{460}$(%) is equivalent to the degree of Hunter Whiteness specified in JIS-P8123. A higher reflectivity $R_{460}$ (%) indicates that a higher brightness and whiteness.

Evaluation of Reflectivity Ratio

The reflectivity $R_{650}$(%) at 650 nm is measured in a manner similar to that of the measurement of the reflectivity $R_{460}$(%). Then, a reflectivity ratio is measured according to the following equation.

$$\text{Reflectivity ratio} = R_{460}(\%)/R_{650}(\%)$$

The results of the above measurement are shown in Tables 1 to 3. The reflectivity ratio of a standard white plate is 1. When the numerical value of the reflectivity ratio is closer to 1, whiteness is higher. However, considering that a little bluish white is generally preferable, the reflectivity ratio is preferably 1.0 or higher and lower than 1.7, and more preferably 1.1 or higher and lower than 1.5. A higher reflectivity ratio indicates that a bluish color is represented and a smaller reflectivity ratio indicates that a reddish color is represented. When the reflectivity ratio is lower than 1.0, redness is too strong, and when the reflectivity ratio is 1.7 or higher, blueness is too strong.

TABLE 1

|  | Liquid crystal display device | Thickness of display layer (μm) | | | Content of cholesteric liquid crystal (weight %) | | Evaluation | |
|---|---|---|---|---|---|---|---|---|
|  |  | Cholesteric liquid crystal 1 | Cholesteric liquid crystal 2 | Cholesteric liquid crystal 3 | Cholesteric liquid crystal 2 | Cholesteric liquid crystal 3 | Reflectivity at 460 nm (%) | Reflectivity ratio between at 460 nm and at 650 nm |
| Ex. A1 | A1 | 5.2 | 20.8 | 0 | 20 | 0 | 44.2 | 1.31 |
| Ex. A2 | A2 | 1.3 | 24.7 | 0 | 5 | 0 | 37.6 | 1.02 |
| Ex. A3 | A3 | 2.6 | 23.4 | 0 | 10 | 0 | 40.1 | 1.12 |
| Ex. A4 | A4 | 3.9 | 22.1 | 0 | 15 | 0 | 42.3 | 1.21 |
| Ex. A5 | A5 | 6.5 | 19.5 | 0 | 25 | 0 | 45.8 | 1.41 |
| Ex. A6 | A6 | 7.5 | 18.5 | 0 | 29 | 0 | 47.0 | 1.49 |
| Ex. A7 | A7 | 9.1 | 16.9 | 0 | 35 | 0 | 48.4 | 1.62 |
| Comp. Ex. A1 | A8 | 0.8 | 25.2 | 0 | 3 | 0 | 36.4 | 0.98 |
| Comp. Ex. A2 | A9 | 13.0 | 13.0 | 0 | 50 | 0 | 50.6 | 1.98 |
| Comp. Ex. A3 | A10 | 26 | 0 | 0 | 0 | 0 | 34.7 | 0.91 |
| Comp. Ex. A4 | A11 | 8.6 | 8.7 | 8.7 | 33.3 | 33.3 | 34.0 | 2.20 |

TABLE 2

|  | Liquid crystal display device | Content of cholesteric liquid crystal (weight %) | | Evaluation | |
|---|---|---|---|---|---|
|  |  | Cholesteric liquid crystal 2 | Cholesteric liquid crystal 3 | Reflectivity at 460 nm (%) | Reflectivity ratio |
| Ex. B1 | B1 | 20 | 0 | 37.2 | 1.12 |
| Ex. B2 | B2 | 30 | 0 | 38.4 | 1.26 |
| Comp. Ex. B1 | B3 | 33.3 | 33.3 | 34.7 | 1.90 |

TABLE 3

|  | Liquid crystal display device | Content of cholesteric liquid crystal 2 (weight %) | Evaluation | |
|---|---|---|---|---|
|  |  |  | Reflectivity at 460 nm (%) | Reflectivity ratio |
| Ex. C1 | C1 | 20 | 38.3 | 1.10 |
| Ex. C2 | C2 | 20 | 36.5 | 1.05 |

The results of Tables 1 to 3 show that a display having higher whiteness is achieved in Examples compared with Comparative Examples.

The foregoing description of the exemplary embodiments of the present invention has been provided for the purposes of illustration and description. It is not limited to be exhaustive or to limit the invention to the precise forms disclosed, Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A liquid crystal-containing composition, comprising a first cholesteric liquid crystal having a peak wavelength of selective reflection in the range of from 600 nm to 800 nm and encapsulated in a microcapsule and a second cholesteric liquid crystal having a peak wavelength of selective reflection in the range of from 400 nm to 500 nm as the only liquid crystals, and the content of the second cholesteric liquid crystal with respect to the entire cholesteric liquid crystal content being from about 5 weight % to about 40 weight %.

2. The liquid crystal-containing composition of claim 1, the first and second cholesteric liquid crystals are encapsulated in separate microcapsules.

3. The liquid crystal-containing composition of claim 1, wherein the microcapsule comprises a wall material comprising at least one material selected from a polyurethane and a polyurea.

4. The liquid crystal-containing composition of claim 2, wherein the microcapsules comprise a wall material comprising at least one material selected from a polyurethane and a polyurea.

5. The liquid crystal-containing composition of claim 3, wherein the wall material comprises a polyurea to which an alkyl group and/or a fluoroalkyl group is bonded directly or indirectly via a urethane bond.

6. The liquid crystal-containing composition of claim 4, wherein the wall material comprises a polyurea to which an alkyl group and/or a fluoroalkyl group is bonded directly or indirectly via a urethane bond.

7. A liquid crystal display device, comprising:
a pair of electrodes; and
at least one display layer comprising a liquid crystal composition held between the electrodes;
the liquid crystal composition comprising a first cholesteric liquid crystal having a peak wavelength of selective reflection in the range of from 600 nm to 800 nm and encapsulated in a microcapsule and a second cholesteric liquid crystal having a peak wavelength of selective reflection in the range of from 400 nm to 500 nm as the only liquid crystals, and the content of the second cholesteric liquid crystal with respect to the entire cholesteric liquid content crystal being from about 5 weight % to about 40 weight %.

8. The liquid crystal display device of claim 7, wherein the first and second cholesteric liquid crystals are encapsulated in separate microcapsules.

9. The liquid crystal display device of claim 7, wherein the microcapsule comprises a wall material comprising at least one material selected from a polyurethane and a polyurea.

10. The liquid crystal display device of claim 8, wherein the microcapsules comprise a wall material comprising at least one material selected from a polyurethane and a polyurea.

11. The liquid crystal display device of claim 9, wherein the wall material comprises a polyurea to which an alkyl group and/or a fluoroalkyl group is bonded directly or indirectly via a urethane bond.

12. The liquid crystal display device of claim 10, wherein the wall material comprises a polyurea to which an alkyl group and/or a fluoroalkyl group is bonded directly or indirectly via a urethane bond.

13. The liquid crystal display device of claim 7, wherein the at least one display layer comprises a first display layer comprising the first cholesteric liquid crystal and a second display layer comprising the second cholesteric liquid crystal.

14. The liquid crystal display device of claim 8, wherein the at least one display layer comprises a first display layer comprising the first cholesteric liquid crystal and a second display layer comprising the second cholesteric liquid crystal.

* * * * *